United States Patent [19]

Murayama et al.

[11] 4,410,898

[45] Oct. 18, 1983

[54] MULTICOLOR HEAT-SENSITIVE RECORDING APPARATUS

[75] Inventors: Tomio Murayama; Fujio Moriguchi; Masami Kurata; Takashi Ohmori; Haruhiko Moriguchi, all of Kanagawa, Japan

[73] Assignee: Fuji Xerox Co., Ltd., Tokyo, Japan

[21] Appl. No.: 348,884

[22] Filed: Feb. 16, 1982

[30] Foreign Application Priority Data

Feb. 17, 1981 [JP] Japan .................................. 56-20958

[51] Int. Cl.[3] ............................................ G01D 15/10

[52] U.S. Cl. ............................... 346/76 PH; 101/183; 271/305; 346/134; 400/120

[58] Field of Search ................ 346/76 PH, 76 R, 134, 346/46; 400/120; 101/183, 184, 232; 271/303, 301, 305; 355/4

[56] References Cited

U.S. PATENT DOCUMENTS 4,067,017 1/1978 Dertouzos ........................ 346/76 X

*Primary Examiner*—Joseph W. Hartary

*Attorney, Agent, or Firm*—Sughrue, Mion, Zinn, Macpeak and Seas

[57] ABSTRACT

A multicolor recording apparatus includes a number of recording sections for applying different colors of inks. A main transport path travels through all recording sections, while bypass paths are provided for recording sheets which are to be recorded monochromatically, for example, so that any one or more of the recording sections may be bypassed. To eliminate wastage of ink donor sheet, the web containing the solid ink is not conveyed in recording sections bypassed by the sheet.

9 Claims, 4 Drawing Figures

MULTICOLOR HEAT-SENSITIVE RECORDING APPARATUS

BACKGROUND OF THE INVENTION

This invention relates to a multicolor heat-sensitive recording apparatus which produces multicolor recording according to a thermal transfer recording system, and more particularly to a multi-color heat-sensitive recording apparatus which, in carrying out the recording operation, allows a recording sheet to pass through only such recording sections as are necessary for a given recording operation.

FIG. 1 illustrates the principle of a thermal transfer type heat-sensitive recording apparatus. In this apparatus, an ink donor sheet 4 and a recording sheet 3 placed thereon run between a heat-sensitive recording head 1 and a pressure roll 2. The ink donor sheet 4 is provided with a support paper 4A which is coated with thermally melting or sublimating solid ink 4B. Therefore, by selectively heating the heat generating resistors 1A of the heat-sensitive recording head 1 according to image data, molten or sublimated ink may be transferred onto the recording sheet 3; that is, the image data are recorded on the sheet.

FIG. 2 depicts a conventional multi-color heat-sensitive recording apparatus operating according to the above-described principle. The apparatus has a sheet conveying path 6 along which a recording sheet 3 is run. First, second and third recording sections 7, 8 and 9 are arranged along the sheet conveying path 3 in the stated order. In the first printing section 7, red color printing is carried out.

The first printing section 7 is provided with a pressure roll 11 provided on one side of the sheet conveying path 6, a thermal head 12 which confronts the pressure roll 11, a supply roll 13, a winding roll which drives or conveys an ink donor sheet 14, which is supplied by the supply roll 13, between the pressure roll 11 and the thermal head 12 and then takes it up, and guides 16 and 17 arranged in the ink donor sheet running system. In the second recording section 8, printing in yellow is carried out. Similarly as in the first recording section 7, the second recording section 8 is provided with a pressure roll 21, a thermal head 22, a supply roll 23 for supplying an ink donor sheet 24, a winding roll 25 and guides 26 and 27. In the third recording section 9, printing in blue is carried out. Similarly, the third recording section 9 is provided with a pressure roll 31, a thermal head 32, a supply roll 33 for supplying an ink donor sheet 34, a winding roll 35 and guides 36 and 37. A pair of conveying rolls 41 and 42 are provided near the start point of the sheet conveying path 6, to convey the recording sheet 3 to the first recording section 7. A pair of discharging rolls 43 and 44 are provided near the end point of the sheet conveying path 6, to deliver the recorded sheet 3 to a discharge tray (not shown).

When the multi-color heat-sensitive recording apparatus thus constructed begins recording, first the recording sheet 3 is delivered to the first recording section 7 by the conveying rolls 41 and 42. Solid, red ink for data recording has been applied to the ink donor sheet 14 in the first recording section 7, and therefore, red image data are recorded on the recording sheet 3 as it passes the thermal head 12. The recording sheet 3 is then forwarded to the second recording section 8 by rotation, in the direction of the arrow, of the pressure roll 11 and by the conveyance, in the direction of the arrow, of the ink donor web 14. Solid, yellow ink for data recording has been applied to the ink donor sheet 24 in the second recording section 8. Therefore, yellow image data are recorded on the sheet. Similarly as in the above-described case, the recording sheet 3 is delivered to the third recording section 9, where blue image data are recorded on the sheet by the ink donor sheet 34 which has been coated with solid, blue ink. As the pressure roll 31 rotates while the ink donor sheet 34 is transported, the recording sheet 3 on which the three color image has been recorded is delivered to the discharging rolls 43 and 44 and is then sent to the discharge tray.

As was described above, in the conventional multi-color heat-sensitive recording apparatus, the recording sheet is conveyed along a single sheet conveying path. Therefore, even when the operation of only one of the recording sections is required, as in the case of monochromatic printing, the ink donor sheets in all of the recording sections must be conveyed because it is necessary to convey the recording sheet to the discharge tray. Therefore, the ink donor sheets are consumed uneconomically. In this point, the conventional apparatus is disadvantageous.

SUMMARY OF THE INVENTION

In view of the foregoing, an object of this invention is to provide a multi-color heat-sensitive recording apparatus in which the ink donor sheets are not consumed in any recording section which is instructed to not carry out the recording operation.

The foregoing object of the invention has been achieved by the provision of a multi-color heat-sensitive recording apparatus which, according to the invention, includes a first sheet conveying path which extends through all recording sections (hereinafter referred to as the "main sheet conveying path"); and secondary sheet conveying paths which allow a recording sheet to bypass a recording section or sections which are not required for the recording operation (hereinafter referred to as "bypassing sheet conveying paths"); and switching means for changing the direction of advance of the recording sheet to cause the recording sheet to advance along the main sheet conveying path and/or the bypass sheet conveying paths, whereby the transport of an ink donor sheet need not occur in a recording section unnecessary to the given recording operation.

DETAILED DESCRIPTION OF THE PREFERRED EMBODIMENTS

Figure 1:
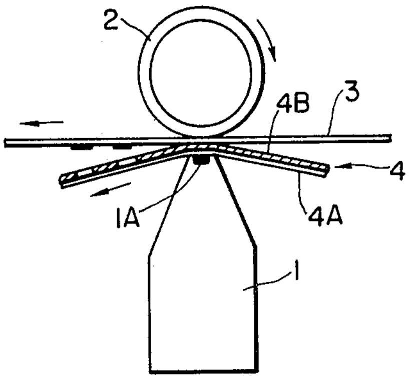
FIG. 1 is an explanatory diagram showing the arrangement of a recording section, for use in describing the principle of a thermal transfer type heat-sensitive recording apparatus.
Figure 2:
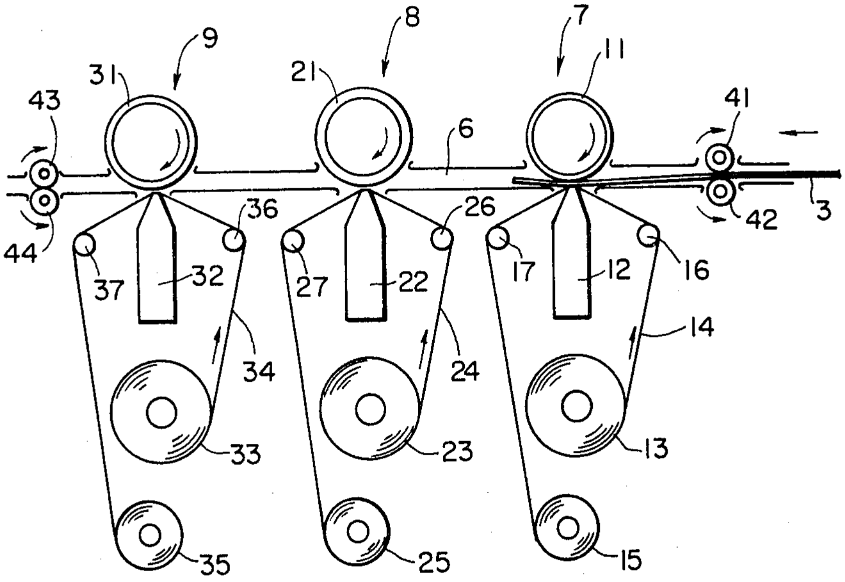
FIG. 2 is an explanatory diagram showing the arrangement of one example of a conventional multi-color heat-sensitive recording apparatus.
Figure 3:
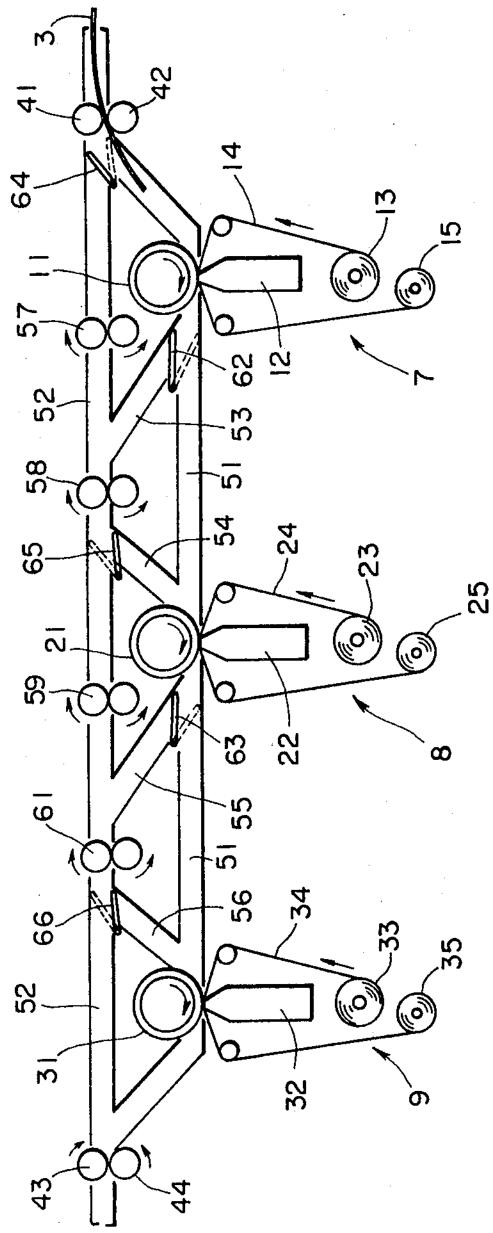
FIG. 3 is an explanatory diagram showing an arrangement according to a first embodiment of the invention.

A first embodiment of the invention is as shown in FIG. 3 in which parts corresponding functionally to those already described with reference to FIG. 2 are designated by corresponding reference numerals. The multi-color heat-sensitive recording apparatus has a main sheet conveying path 51, an auxiliary sheet conveying path 52 and bypassing sheet conveying paths 53 through 56 between a pair of conveying rolls 41 and 42 and a pair of discharging rolls 43 and 44. The main sheet conveying path 51 extends through all three of the recording sections 7, 8 and 9. The auxiliary sheet conveying path 52 extends parallel to the main path and separate from the recording sections 7, 8 and 9. The paths 51 and 52 are connected to each other alternately be means of the bypass sheet conveying paths 53 through 56.

Pairs of pressure rolls 57, 58, 59 and 61, which are turned in the illustrated directions, are provided before and after the intersections of the path 52 and the bypass paths 53 through 56. Pivotable switching levers 62 and 63 are provided downstream of the first and second recording sections 7 and 8, repectively, and are pivoted as indicated by the solid and phantom lines to change the sheet advance course defined by the main sheet conveying path and the bypass sheet conveying paths 53 and 55. Similarly, switching levers 64 through 66 are provided near the pair of conveying rolls 41 and 42 and near the intersections downstream of the pairs of rollers 58 and 61, respectively.

When a recording is to be made on a sheet 3 in three colors, the switching levers 62, 63 and 64 are set at the positions indicated by the solid lines. Therefore, the recording sheet 3 is conveyed successively through the first, second and third recording sections 7, 8 and 9, so that thermal transfer recording with ink of all three colors is carried out.

In the case where only the first and second recording sections 7 and 8 are to be used for recording, the switching levers 62 and 64 are set at the positions indicated by the solid lines, while the switching lever 63 is set at the position indicated by the phantom line. After passting through the second recording section 8, the sheet 3 is conveyed along the bypass sheet conveying path 55 and the path 52 and is then discharged. In this case the sheet 3 goes around the third recording section 9, which is necessary for this recording operation. Similarly, in order to cause the recording sheet 3 to go around the first recording section 7, the position of the switching lever 64 is switched to the position indicated by the phantom line, and thereafter the positions of the switching levers 65 and 66 are selectively changed as required. In this case, recording can be carried out by only one of the second and third recording sections 8 and 9 or by both recording sections.

Accordingly, heat-sensitive recording can be carried out with inks of three colors, inks of two colors or ink of one color, by selectively changing the positions of the switching levers 62 through 66.

In the multi-color heat-sensitive recording apparatus described above, the recording sheet 3 is caused to bypass a recording section or recording sections which are not required for a particular recording operation, by changing the positions of switching levers. During this operation, a control circuit (not shown) operates to stop the pressure roll and the winding roll in the recording sections bypassed by the sheet. Therefore, the ink donor sheets are not uneconomically used in recording sections which are not required for the recording operation.

Figure 4:
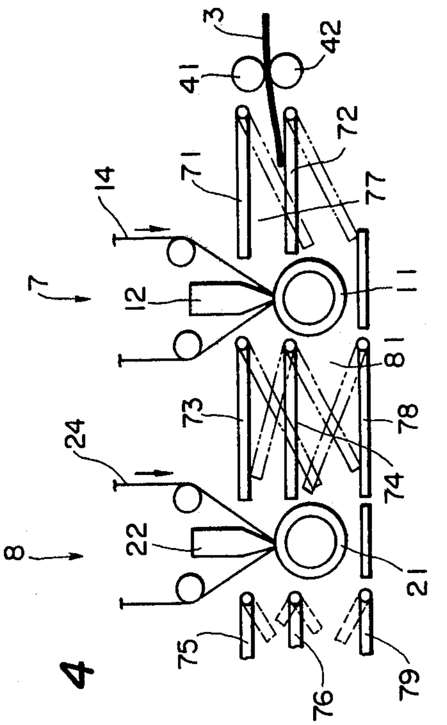
FIG. 4 is an explanatory diagram showing an arrangement of a multi-color heat-sensitive recording apparatus according to a second embodiment of the invention.

A second embodiment of the invention is as shown in FIG. 4, in which those components similar to those in FIG. 3 are designated by corresponding reference numerals. In this multi-color heat-sensitive recording apparatus, the main sheet conveying path 77 is formed with guide plates 71–76 which are disposed between the pair of conveying rolls 41 and 42 and the first recording section 7, between the first and second recording sections 7 and 8, and between the section 8 and a further section, as shown in FIG. 4. Guide plates 78 and 79 are additionally provided below the guide plates 74 and 76, respectively, to form a bypass sheet conveying path 81. Similarly as in the first embodiment, a third recording section 9 (not shown) is provided downstream of the second recording section (on the left-hand side in FIG. 4).

In the case where, with this apparatus, image data are to be recorded on a sheet 3 in three colors, the guide plates 71 through 76 are at the positions indicated by the solid lines, respectively. Therefore, in this case, the recording sheet 3 will go through each of the recording sections 7, 8 and 9. In the case where a recording is to be made by allowing the recording sheet 3 to bypass the first recording section 7, the positions of the guide plates 71 and 72 and the positions of the guide plates 74 and 78 are switched to the positions indicated by the phantom lines. In the case where it is desired that the recording sheet 3 bypass only the second recording section 8, the positions of the guide plates 73 and 74, and 76 and 79 are switched to the positions indicated by the phantom lines.

Accordingly, thermal transfer recording can be carried out with inks of three colors, inks of any two desired colors or ink of only one color, by selectively changing the positions of the switching plates 71 through 76, 78 and 79. Similarly as in the first embodiment, a control circuit is employed to stop the pressure roll and the winding roll in the recording section or sections bypassed by the recording sheet, so that the ink donor sheets therein are not uneconomically used.

As is apparaent from the above description, the multi-color heat-sensitive recording apparatus according to the invention has a main sheet conveying path which extends through a plurality of recording sections arranged in a line, or in a recording sheet conveyance direction, the bypass sheet conveying paths which allow the recording sheet to go around any one of the recording sections, and the switching levers or guide plates, the positions of which are selectively changed so that the recording sheet bypasses the recording section or sections which are unnecessary for a given recording operation; that is, the recording sheet goes through only the sections necessary to achieve a particular recording operation. Therefore, the conveyance of the ink donor sheets in recording sections unnecessary to the recording operation can be stopped; that is, the wasteful use of ink donor sheet can be prevented. Furthermore, if the feed rolls at the bypassing sheet conveying paths are turned at high speed, then, in the case where a section or sections of the recording operation are omitted, the time required for the entire recording operation can be made much shorter than that of prior art.

What is claimed is:

1. A multicolor heat-sensitive recording apparatus having a plurality of recording stations, in each of which an ink donor sheet and a recording sheet placed thereon are run between a heat-sensitive recording head and a pressure roll which is turned while abutting said recording head under pressure, and thermally melting or sublimating ink is thermally transferred onto said recording sheet according to image signals applied to said recording head, comprising;

a main sheet conveying path extending through said recording sections;

bypass sheet conveying paths which selectively allow a recording sheet to bypass any one or more of said recording sections; and switching means for changing the direction of advance of said recording sheet to cause said recording sheet to advance along said either main sheet conveying path or said bypassing sheet conveying paths, as desired.

2. A recording apparatus as claimed in claim 1, said main sheet conveying path extending through each of said recording sections, said bypass conveying paths allowing said sheet to pass by selected pressure rolls without passing between said pressure rolls and said recording heads associated therewith, whereby the rotation of said pressure rolls and the transport of said ink donor sheet may be halted for any recording section bypassed.

3. A recording apparatus as claimed in claims 1 or 2, said switching means comprising pivotable levers arranged at intersections of said main conveying path and said bypass paths, said levers being selectively positioned so as to channel a recording sheet through only selected ones of said recording stations.

4. A recording apparatus as claimed in claims 1 or 2, wherein there are provided recording sections, and 2n-1 switching means, whereby, before each recording section and after each recording section excepting the last such recording section, a recording sheet may be selectively switched from either a main or a bypass path, to the other.

5. A recording apparatus as claimed in claims 1 or 2, wherein said switching means comprises pivotable plate means, said plates being pivotable in pairs to form shiftable guide channels.

6. A recording apparatus as claimed in claim 5, said shiftable guide channels being selectively pivotable to allow said recording sheet to pass through a selected one, selected ones or all of said recording sections.

7. A recording apparatus as claimed in claim 6, wherein at least the ink donor sheet of a bypassed recording section is maintained stationary during transport of said recording sheet.

8. A multicolor recording apparatus, comprising; a plurality of recording stations, each said station including an ink donor sheet and a recording head, a main sheet conveying path extending through each of said recording stations, a second sheet conveying path extending through none of said stations, a plurality of third sheet conveying paths which selectively allow a recording sheet to bypass any one or more of said recording sections, and means for shifting the direction of advance of said recording sheet from said main path to said second path via one of said third paths, and from said second path to said main path via another of said third paths, respectively, to bypass selected recording stations.

9. A multicolor recording apparatus as claimed in claim 8, wherein a recording sheet is conveyed, in a recording section at least partially by said ink donor sheet, and is conveyed, when bypassing a recording section, by means other than said ink donor sheet, whereby the ink donor sheet of any bypassed recording station is not advanced during the transport of said recording sheet.

* * * * *